United States Patent
Tsuda et al.

(10) Patent No.: US 8,423,213 B2
(45) Date of Patent: *Apr. 16, 2013

(54) VEHICLE CONTROL DEVICE

(75) Inventors: Kohei Tsuda, Anjo (JP); Yomei Hakumura, Anjo (JP); Masahiro Asai, Anjo (JP); Yoichi Tajima, Anjo (JP); Tomokazu Ito, Okazaki (JP)

(73) Assignee: Aisin AW Co., Ltd., Anjo-Shi (JP)

( * ) Notice: Subject to any disclaimer, the term of this patent is extended or adjusted under 35 U.S.C. 154(b) by 319 days.

This patent is subject to a terminal disclaimer.

(21) Appl. No.: 12/879,461

(22) Filed: Sep. 10, 2010

(65) Prior Publication Data

US 2011/0106356 A1 May 5, 2011

(30) Foreign Application Priority Data

Oct. 30, 2009 (JP) .................................. 2009-251501

(51) Int. Cl.
*G05D 1/00* (2006.01)

(52) U.S. Cl.
USPC .................. 701/22; 701/36; 701/51; 701/53; 701/54; 701/56; 701/60; 701/61; 701/67; 701/68; 701/79; 903/902

(58) Field of Classification Search .................... 701/22, 701/51, 64, 79, 81–82, 86–87, 90, 53–56, 701/36, 67–68, 60–61; 903/902; 477/5; 180/65.275; 123/406.11, 406.23
See application file for complete search history.

(56) References Cited

U.S. PATENT DOCUMENTS

| 4,525,781 | A  | * | 6/1985  | Konomi et al. | ................. 701/99  |
| 6,393,349 | B1 | * | 5/2002  | Yasuoka       | .......................... 701/54  |
| 6,543,220 | B2 | * | 4/2003  | Yoshida et al. | ................. 60/285  |
| 7,958,868 | B2 | * | 6/2011  | Sugai et al.  | ............. 123/406.11 |
| 2005/0288147 | A1 |   | 12/2005 | Endo et al.   |                          |
| 2011/0106355 | A1 | * | 5/2011  | Tsuda et al.  | .................... 701/22 |

FOREIGN PATENT DOCUMENTS

| JP | A-09-331603  | 12/1997 |
| JP | A-10-257610  | 9/1998  |
| JP | A-2004-203220 | 7/2004  |
| JP | A-2009-6735  | 1/2009  |

OTHER PUBLICATIONS

Dec. 28, 2010 International Search Report issued in PCT/JP2010/065978 (with translation).

\* cited by examiner

*Primary Examiner* — Gertrude Arthur Jeanglaude
(74) *Attorney, Agent, or Firm* — Oliff & Berridge, PLC

(57) ABSTRACT

A vehicle control device for controlling a vehicle drive apparatus, the vehicle control device configured with a phase determining mechanism that determines the end of the torque phase in a shift operation, and a rotary electrical machine control mechanism that controls the torque of the rotary electrical machine using a variation of input torque. The vehicle control device is also configured with an engagement control mechanism that provides feedback controlling supplied oil pressure to an engagement side element as an engagement element on a side to be engaged after switching of shift speeds so that the rotation speed change rate of the input member becomes the target rotation speed change rate.

7 Claims, 6 Drawing Sheets

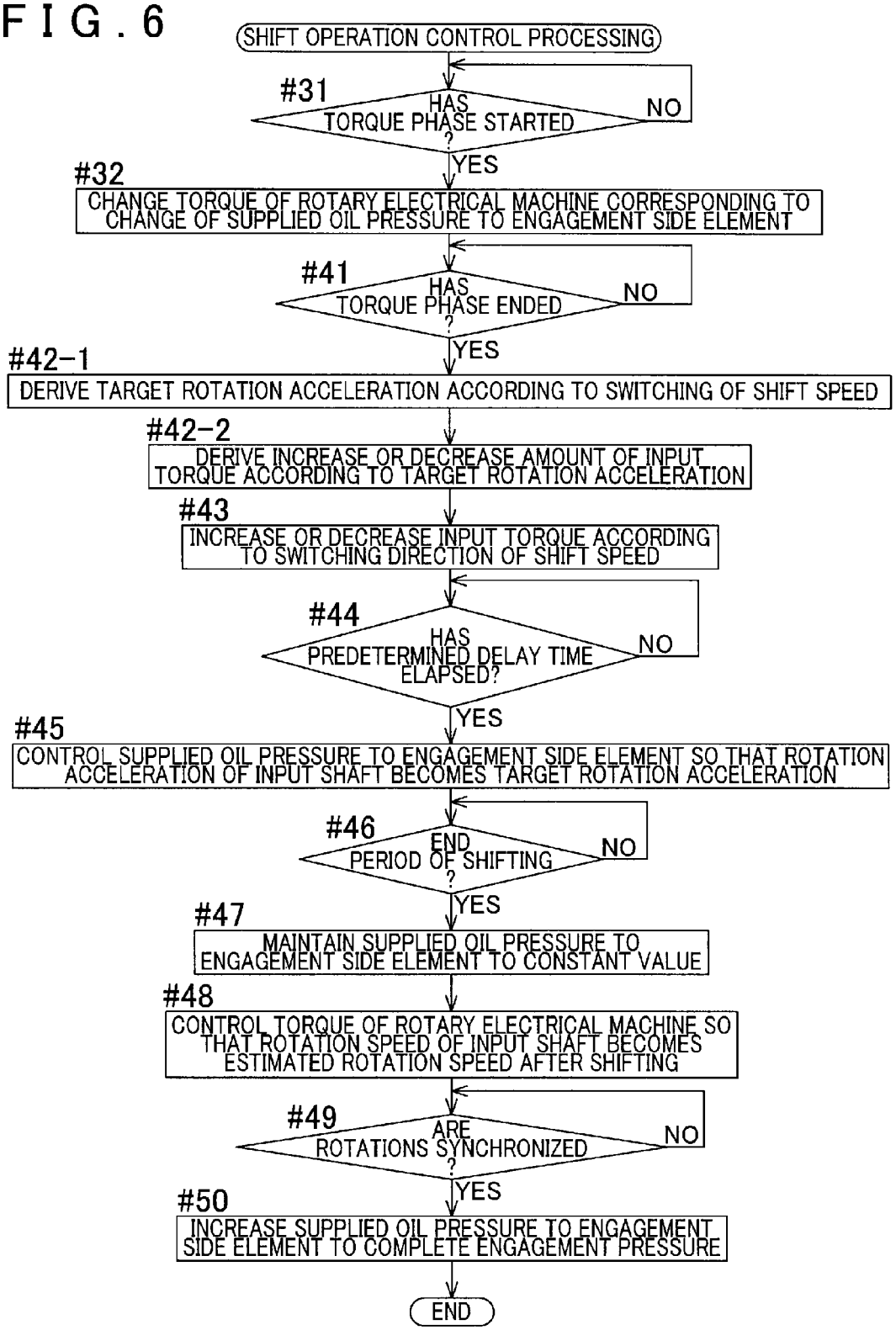

VEHICLE CONTROL DEVICE

INCORORATION BY REFERENCE

The disclosure of Japanese Patent Application No. 2009-251501 filed on Oct. 30, 2009, including the specification, drawings and abstract is incorporated herein by reference in its entirety.

BACKGROUND OF THE INVENTION

The present invention relates to a vehicle control device for controlling a vehicle drive apparatus, which includes an input member drive-coupled to a rotary electrical machine as a driving force source, an output member drive-coupled to wheels, and a transmission shifting a rotation speed of the input member with speed ratios of shift speeds and transmitting the shifted speed to the output member.

DESCRIPTION OF THE RELATED ART

In late years, electric vehicles having only a rotary electrical machine as a driving force source and hybrid vehicles having both an engine and a rotary electrical machine as driving force sources are in practical use. As an example of a vehicle drive apparatus used for such vehicles, for example, Japanese Patent Application Publication No. JP-A-2009-006735 listed below describes a vehicle drive apparatus structured to shift rotational driving forces of an engine and a rotary electrical machine as driving force sources with speed ratios of shift speeds set in a transmission and outputs the shifted rotational driving forces. The transmission of the vehicle drive apparatus described in Japanese Patent Application Publication No. JP-A-2009-006735 includes a plurality of engagement elements and is structured to be capable of switching the plurality of shift speeds by controlling engagement and release of the plurality of engagement elements, shifting the rotation speed of the input member with speed ratios of the shift speeds, and transmitting the shifted rotation speed to the output member.

In such a transmission, switching between shift speeds is performed via phases of a torque phase and an inertia phase. Here, the "torque phase" may be determined as a period from a time point when an engaged engagement element starts to have a transfer torque capacity after a target shift speed in the transmission is changed to a time point when an input/output rotation speed ratio (=ratio of the rotation speed of the input member to the rotation speed of the output member) starts to change. The "inertia phase" may be determined as a period from a time point when the input/output rotation speed rain starts to change (=time point of end of the torque phase) to a time point when the input/output rotation speed ratio becomes the speed ratio of the target shift speed after shifting.

In such a shift operation in the transmission, in order to reduce a shift shock, torque to be inputted to the transmission via the input member from the rotary electrical machine as a driving force source may be controlled in the inertia phase after the torque phase has ended. In a vehicle control device for controlling the vehicle drive apparatus described in Japanese Patent Application Publication No. JP-A-2009-006735, for example during a downshift (switching of shift speeds from a shift speed with a smaller speed ratio to a shift speed with a larger speed ratio) in a state that the rotary electrical machine is performing regeneration, a change of the driving force is suppressed by starting the shifting after regeneration torque of the rotary electrical machine is changed to zero. Thereafter, when the torque phase finishes and then the inertia phase starts, predetermined torque is outputted to the rotary electrical machine to facilitate the shifting, thereby reducing the shifting time. In doing so, the vehicle control device described in Japanese Patent Application Publication No. JP-A-2009-006735 increases a hydraulic instruction value to an engagement side element as an engagement element on the side to be engaged after switching of shift speeds gradually by a constant rate (see FIG. 7).

SUMMARY OF THE INVENTION

However, in the engagement element structured generally using a friction member such as a brake and a clutch, the friction coefficient does not become a constant value and may change even in one time of shift operation, due to a rotation speed difference between two engagement elements engaged with each other, temperatures of the friction elements, and the like. Accordingly, even when the hydraulic instruction value in the engagement side element is increased gradually by a constant rate as described in the vehicle control device described in Japanese Patent Application Publication No. JP-A-2009-006735, the transfer torque capacity in the engagement side element increases irregularly due to the change of the friction coefficient in practice. As a result, torque transmitted to the output member changes as well, and this causes deterioration of the traveling feeling of the driver of the vehicle.

Accordingly, it is desired to achieve a vehicle control device capable of suppressing a torque change transmitted to the output member by suppressing a change of the transfer torque capacity of the engagement element due to a change of the friction coefficient.

A vehicle control device according to the present invention controls a vehicle drive apparatus, which includes an input member drive-coupled to a rotary electrical machine as a driving force source, an output member drive-coupled to a wheel, and a transmission having a plurality of engagement elements and a plurality of shift speeds in a switchable manner, shifting a rotation speed of the input member with speed ratios of the shift speeds and transmitting the shifted speed to the output member, wherein the vehicle control device controls switching of shift speeds, which is performed at least via a torque phase in the transmission, by controlling engagement and release of the plurality of engagement elements. A characteristic structure of the vehicle control device resides in that it includes a phase determining mechanism for determining end of the torque phase in a shift operation, a rotary electrical machine control mechanism for controlling torque of the rotary electrical machine using a variation of input torque, which is derived so that a rotation speed change rate of the input member becomes a target rotation speed change rate, so as to increase or decrease input torque inputted to the input member by the variation of the input torque according to a direction of switching of shift speeds after the phase determining mechanism determines that the torque phase has ended, and an engagement control mechanism for feedback controlling supplied oil pressure to an engagement side element as an engagement element on a side to be engaged after switching of shift speeds so that the rotation speed change rate of the input member becomes the target rotation speed change rate.

In the present application, the "torque phase" refers to a period from a time point when the engagement side element starts to have a transfer torque capacity after a target shift speed in the transmission is changed to a time point when a ratio of a rotation speed of the input member to a rotation speed of the output member changes to the side of the speed ratio of a target shift speed after shifting rather than the speed ratio of a target shift speed before shifting.

The "drive-coupled" refers to a state that two rotational elements are coupled so as to be capable of transmitting a driving force, and is used as a concept including a state that the two rotational elements are coupled to rotate integrally or a state that the two rotational elements are coupled to be capable of transmitting a driving force via one or more transmission members. Such transmission members include various members transmitting a rotation at the same speed or after shifting the rotation speed, and include, for example, a shaft, a gear mechanism, a belt, a chain, and the like.

In the above-described characteristic structure, the rotary electrical machine control mechanism controls the torque of the rotary electrical machine so as to increase or decrease input torque inputted to the input member according to a direction of switching of shift speeds after the phase determining mechanism determines that the torque phase has ended. With the input torque being increased or decreased, the rotation speed of the input member changes from the rotation speed corresponding to a speed ratio before switching of shift speeds to the rotation speed corresponding to a speed ratio after switching of shift speeds. At this time, in an ideal state that the transfer torque capacity in the engagement side element is kept constant, according to the laws of mechanics, the rotation speed of the input member should change by the time change rate corresponding to a variation of the input torque. Conversely, when the rotation speed of the input member changes by the time change rate corresponding to the variation of the input torque, the transfer torque capacity in the engagement side element should be kept substantially constant.

Accordingly, in the above-described characteristic structure, the rotary electrical machine control mechanism controls the torque of the rotary electrical machine so as to increase or decrease input torque to the input member according to a direction of switching of shift speeds by the variation of the input torque, which is derived so that the rotation speed change rate of the input member becomes the target rotation speed change rate, and the engagement control mechanism feedback controls the supplied oil pressure to the engagement side element so that the rotation speed change rate of the input member becomes the target rotation speed change rate. Thus, the rotation speed of the input member is changed by the time change rate corresponding to the variation of the input torque, whereby the transfer torque capacity in the engagement side element can be kept substantially constant. In other words, the influence of an irregular change of a friction coefficient in an engagement element due to a rotation speed difference between two engagement elements engaged with each other, temperatures of engagement elements, and the like is absorbed by the supplied oil pressure to the engagement side element, whereby the transfer torque capacity of the engagement side element can be kept substantially constant. Therefore, the vehicle control device capable of suppressing a torque change transmitted to the output member is achieved.

Here, in another preferred structure, the rotary electrical machine control mechanism keeps the input torque at a constant value in a state that the input torque is increased or decreased.

In this structure, the input torque is fixed to a constant value which does not change over time, and thus the target rotation speed change rate of the input member derived corresponding to the variation of the input torque becomes a constant value which does not change over time. Here, the target rotation speed change rate is a target of control in the feedback control of the supplied oil pressure to the engagement side element performed by the engagement control mechanism. Accordingly, it is easy to keep the transfer torque capacity of the engagement side element substantially constant by the feedback control performed by the engagement control mechanism. Therefore, a torque change of the output member in a shift operation can be suppressed easily.

In another preferred structure, the target rotation speed change rate is determined based on speed ratios before and after switching of shift speeds so that an inertia phase in the shift operation can end in a target time.

In the present application, the "inertia phase" refers to a period from a time point when a ratio of the rotation speed of the input member to the rotation speed of the output member changes to the side of the speed ratio of the target shift speed after shifting rather than the speed ratio of the target shift speed before shifting to a time point when the ratio of the rotation speed of the input member to the rotation speed of the output member becomes the speed ratio of the target shift speed after shifting.

With this structure, the target rotation speed change rate can be determined appropriately based on speed ratios before and after switching of shift speeds.

In another preferred structure, after an actual rotation speed of the input member becomes close to an estimated rotation speed after shifting of the input member, which is derived based on a rotation speed of the output member and a speed ratio of the transmission after shifting, in a state that the engagement control mechanism keeps the supplied oil pressure to the engagement side element at a constant value, the rotary electrical machine control mechanism feedback controls the torque of the rotary electrical machine so as to synchronize the actual rotation speed of the input member with the estimated rotation speed after shifting.

With this structure, it is possible to change the actual rotation speed of the input member smoothly to be close to the estimated rotation speed after shifting, and effectively suppress occurrence of shift shock when the engagement side element is brought to a completely engaged state when the shift operation finishes.

In another preferred structure, the vehicle control device further includes a release control mechanism for feedback controlling supplied oil pressure to a release side element as an engagement element on a side to be released so that a differential rotation speed becomes substantially constant, which is a difference in rotation speed between the actual rotation speed of the input member and an estimated rotation speed before shifting of the input member derived based on the rotation speed of the output member before shifting and a speed ratio of the transmission, and an engagement control mechanism for increasing the supplied oil pressure to the engagement side element in a state that the differential rotation speed is substantially constant. The phase determining mechanism determines that the torque phase has ended when at least one of the following conditions is met: change of a release side hydraulic instruction value, which is an instruction value of the supplied oil pressure to the release side element, to be equal to a predetermined release determining value corresponding to oil pressure at which a transfer torque capacity in the release side element becomes zero is detected; and decrease of the differential rotation speed to zero is detected.

In the present application, the "substantially constant" refers to being constant to a degree that it can be assumed as not changing in terms of control even when there is a small change in the strict sense.

With this structure, in a state that the differential rotation speed is kept substantially constant by the feedback control by the release control mechanism, the engagement control mechanism increases the supplied oil pressure to the engagement side element. In this state, the differential rotation speed is kept in a substantially constant state by a feedback control system by the release control mechanism. When the engagement control mechanism continues to increase the supplied oil pressure to the engagement side element, the supplied oil pressure to the release side element soon decreases to a predetermined value or lower corresponding to this increase, and the release side element no longer has the transfer torque capacity. The change of the actual rotation speed of the input member can no longer be absorbed by the feedback control system by the release control mechanism. At this time point, the differential rotation speed becomes zero, and the ratio of the rotation speed of the input member to the rotation speed of the output member changes to the side of the speed ratio of the target shift speed after shifting rather than the speed ratio of the target shift speed before shifting.

Accordingly, in the above-described structure, with reference to the predetermined release determining value corresponding to oil pressure at which the release side element no longer has the transfer torque capacity, at least one of detection of decrease of the release side hydraulic instruction value to be equal to or smaller than the release determining value and detection of decrease of the differential rotation speed to zero is employed as a determination condition of end of the torque phase. Thus, using information of the differential rotation speed as a target of control and information of the release side hydraulic instruction value which is sequentially updated in the feedback control by the release control mechanism, end of the torque phase in a shift operation can be determined accurately and reliably.

BRIEF DESCRIPTION OF THE DRAWINGS

FIG. 6 is a flowchart illustrating a processing procedure of shift operation control processing.

DETAILED DESCRIPTION OF THE EMBODIMENTS

Figure 1:
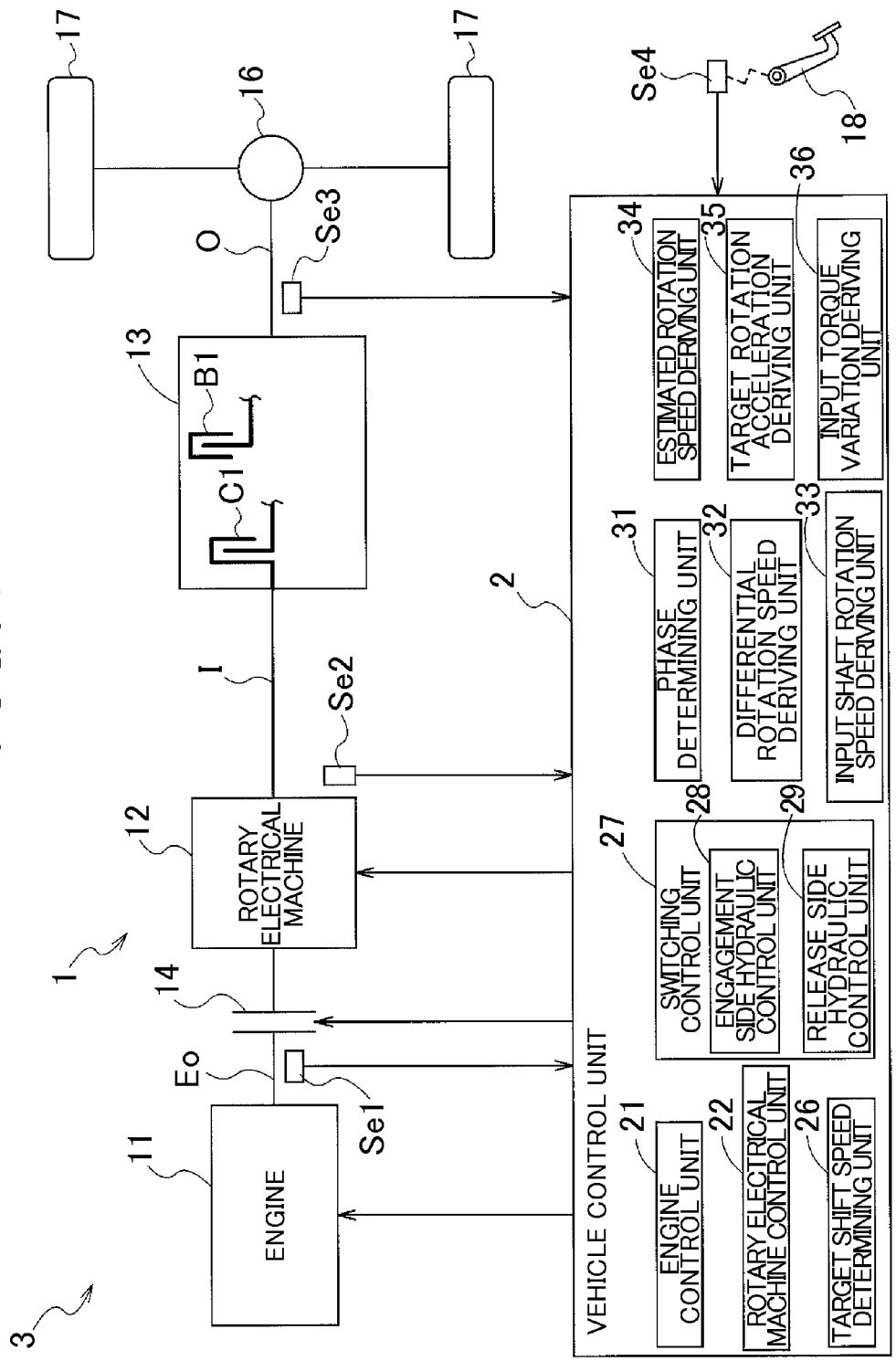
FIG. 1 is a schematic diagram illustrating a general structure of a vehicle drive apparatus according to this embodiment.

An embodiment of a vehicle drive apparatus 1 and a vehicle control unit 2 according to the present invention will be described with reference to the drawings. FIG. 1 is a schematic diagram illustrating a general structure of the vehicle drive apparatus 1 according to this embodiment. As illustrated in this diagram, a vehicle 3 having the vehicle drive apparatus 1 is a hybrid vehicle including both an engine 11 and a rotary electrical machine 12 as driving force sources. The vehicle drive apparatus 1 has an input shaft I drive-coupled to the engine 11 and the rotary electrical machine 12 as driving force sources, an output shaft O drive-coupled to wheels 17, and a transmission 13 having a plurality of engagement elements C1, B1 . . . and a plurality of shift speeds in a switchable manner, shifting a rotation speed of the input shaft I with speed ratios of the shift speeds and transmitting the shifted speed to the output shaft O. The vehicle 3 also includes a vehicle control unit 2 for controlling the vehicle drive apparatus 1, which controls switching of the shift speeds performed via at least a torque phase Pt (see FIG. 2 and FIG. 3). in the transmission 13 by controlling engagement and release of the plurality of engagement elements C1, B1. . . . In this embodiment, the input shaft I and the output shaft O correspond to an "input member" and an "output member" respectively in the present invention, and the vehicle control unit 2 corresponds to a "vehicle control device" in the present invention.

In such a structure, the vehicle control unit 2 according to this embodiment is characterized by including: a phase determining unit 31 determining end of the torque phase Pt in a shift operation; a rotary electrical machine control unit 22 controlling torque of the rotary electrical machine 12 so as to increase or decrease input torque inputted to the input shaft I according to the direction of switching of shift speeds, after the phase determining unit 31 determines that the torque phase Pt has ended, by an input torque variation $\Delta T$ derived so that a rotation acceleration (=rotation speed change rate) A of the input shaft I becomes a target rotation acceleration (=target rotation speed change rate) A0 of the input shaft I; and an engagement side hydraulic control unit 28 feedback controlling supplied oil pressure to an engagement side element Ee so that the rotation acceleration A of the input shaft I becomes the target rotation acceleration A0. Thus, the vehicle control unit 2 capable of suppressing a torque change transmitted to the output shaft O by suppressing a change of the transfer torque capacity of the engagement side element Ee due to a change of a friction coefficient is achieved. The vehicle drive apparatus 1 and the vehicle control unit 2 according to this embodiment will be described in detail below.

1. Structure of Drive Transfer System of the Vehicle Drive Apparatus

The engine 11 is an internal combustion engine driven by combustion of fuel, for which various types of publicly known engines, such as a gasoline engine and a diesel engine, can be used, for example. The engine 11 is drive-coupled to the input shaft I via an input clutch 14. In this example, an engine output shaft Eo such as a crank shaft of the engine 11 is drive-coupled to the input shaft I via the input clutch 14. The input shaft I is drive-coupled to a rotor (not shown) of the rotary electrical machine 12 so as to integrally rotate therewith.

The rotary electrical machine 12 is structured having a rotor and a stator (not illustrated), and is capable of performing a function as a motor (electric motor) generating motive power while receiving supply of electric power, and a function as a generator (power generator) generating electric power while receiving supply of motive power. Accordingly, the rotary electrical machine 12 is electrically connected to a not-illustrated power storage. In this example, a battery is used as the power storage. It is also preferred to use a capacitor or the like as the power storage. The rotary electrical machine 12 powers the vehicle by receiving supply of electric power from the battery, or supplies the battery with the electric power generated by driving forces transmitted from the wheels 17, and the power is stored in the battery. Note that the generation of power by the rotary electrical machine 12 may be hereinafter referred to as "regeneration". The rotor of the rotary electrical machine 12 integrally rotating with the input shaft I is drive-coupled to the transmission 13.

The transmission 13 is a stepped automatic transmission having a plurality of shift speeds with different speed ratios. The transmission 13 has a gear mechanism such as a planetary gear mechanism and the plurality of engagement elements B1, C1 . . . for forming the plurality of shift speeds. In this example, the plurality of engagement elements B1, C1, ... are friction engagement elements such as a clutch and a brake, each of which is structured having a friction material. Each of these engagement elements B1, C1, ... is a clutch (including a brake; the same applies below) capable of sequentially controlling increase or decrease of a transfer torque capacity by controlling supplied oil pressure. As such a clutch, for example, a multi-plate wet clutch or the like is preferably used. In FIG. 1, as an example of the plurality of engagement elements, the first clutch C1 and the first brake B1 are illustrated schematically. By switching engagement or release of the plurality of engagement elements, the rotation state of the plurality of rotation elements included in the gear mechanism is switched, thereby performing switching of shift speeds.

When shift speeds are switched, there is performed what is called changeover shifting, in which one of engaged engagement elements is released before shifting is performed, and one of released engagement elements is engaged before shifting is performed. In the description below, when shifting from a second speed to a third speed (hereinafter referred to as "2-3 upshift") is performed as an example, the first brake B1 is released and the first clutch C1 is engaged. In this case, when shifting from the third speed to the second speed (hereinafter referred to as "3-2 downshift") is performed, the first clutch C1 is released and the first brake B1 is engaged.

Figure 2:
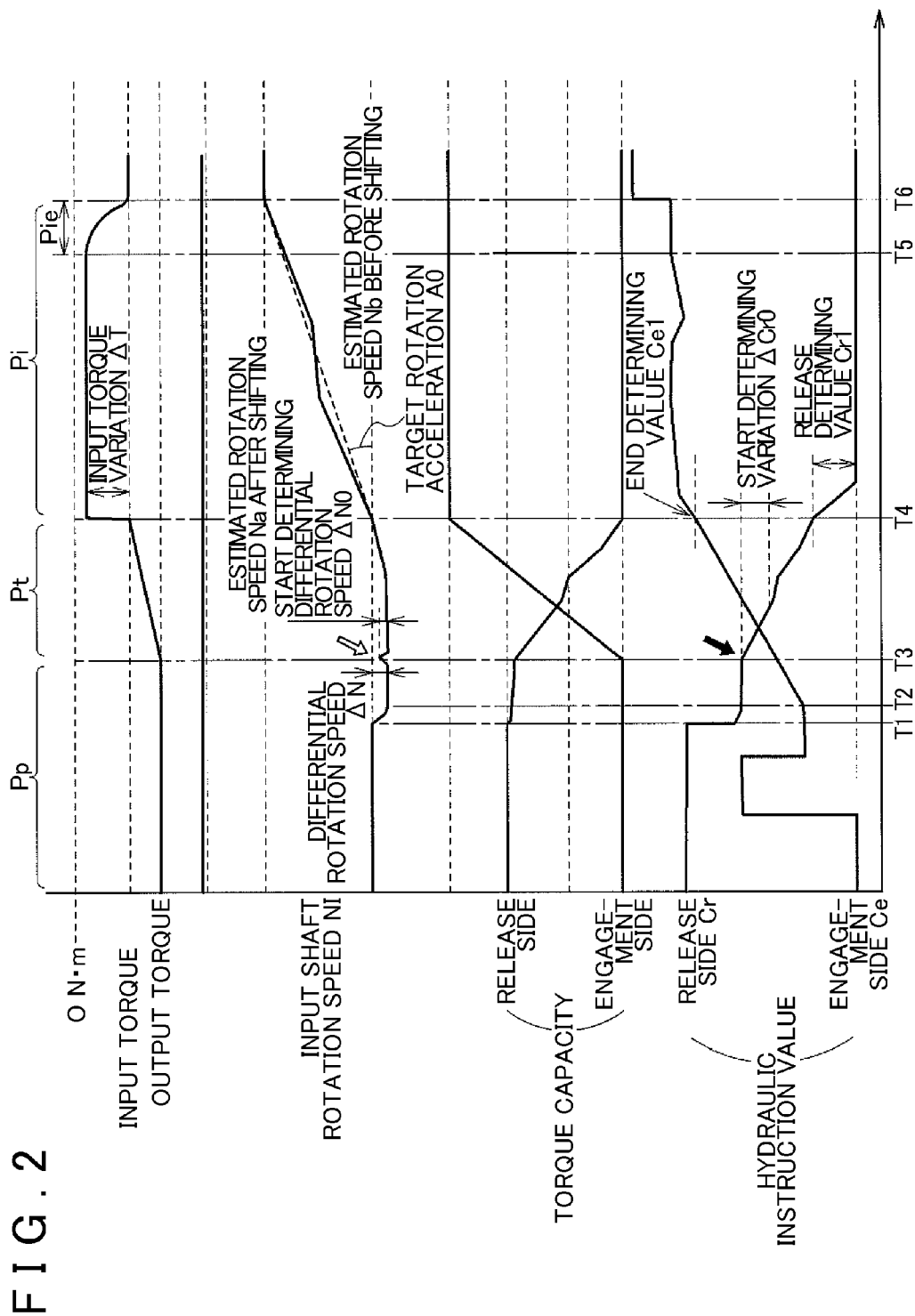
FIG. 2 is a time chart for performing a regeneration downshift.
Figure 3:
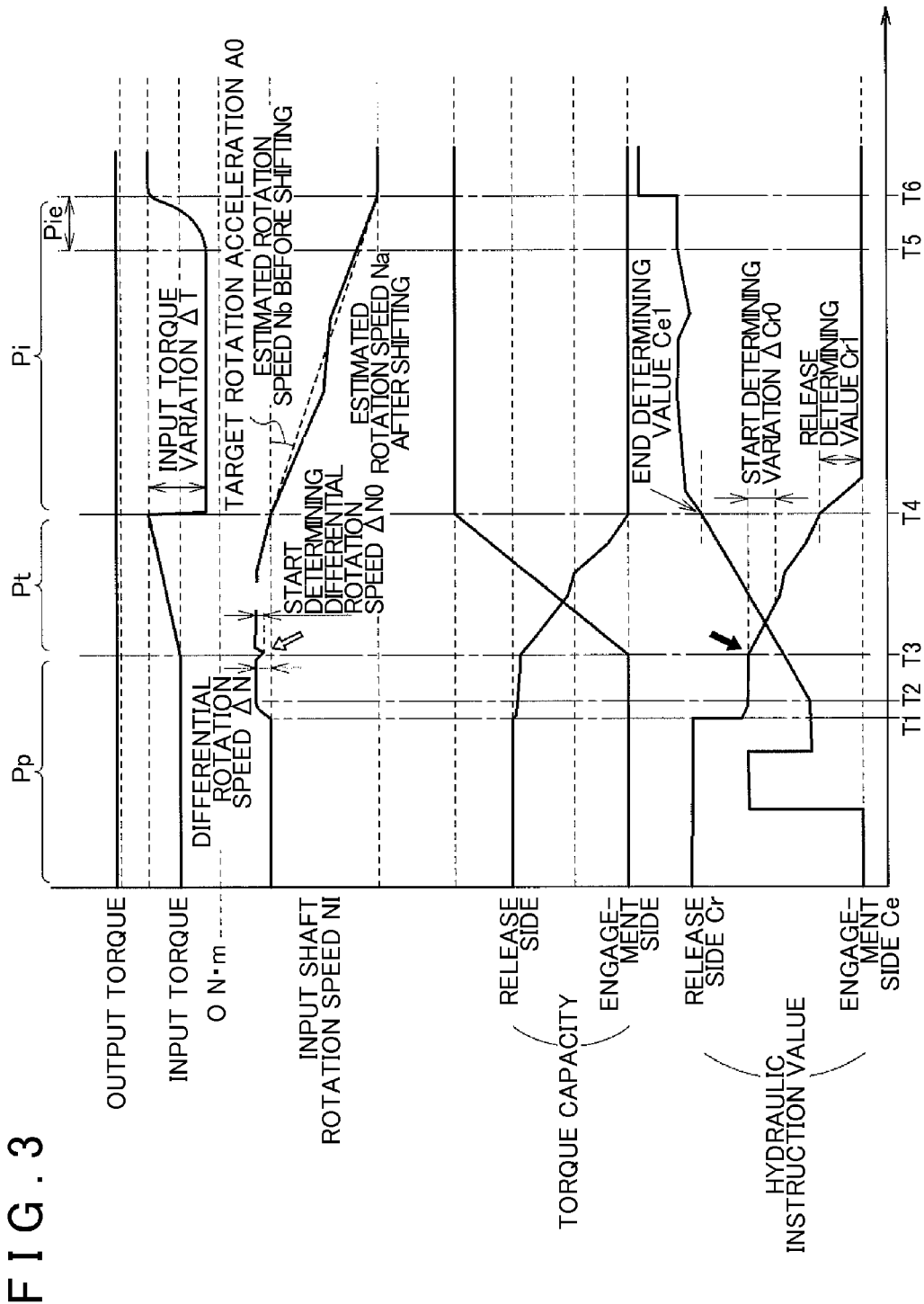
FIG. 3 is a time chart for performing a power-on upshift.

In a shift operation, switching between shift speeds is performed via phases of a pre-control phase Pp, a torque phase Pt, and an inertia phase Pi (see FIG. 2 and FIG. 3). Here, the "pre-control phase Pp" refers to a period from a time point when a target shift speed is changed in the transmission 13 to a time point when an engaged engagement element (for example, the first brake B1 in the 3-2 downshift) starts to have a transfer torque capacity. The "torque phase Pt" refers to a period from a time point when the engaged engagement element (the first brake B1) starts to have a transfer torque capacity to a time point when an actual gear ratio (=input/output rotation speed ratio, namely, a ratio of the rotation speed of the input shaft I to the rotation speed of the output shaft O; the same applies below) starts to change toward the side of the speed ratio of a target shift speed after shifting rather than the speed ratio of the target shift speed before shifting. The "inertia phase Pi" refers to a period from a time point when the actual gear ratio starts to change toward the speed ratio side of the target shift speed after shifting rather than the speed ratio of the target shift speed before shifting (=time point of end of the torque phase Pt) to a time point when the actual gear ratio becomes the speed ratio of the target shift speed after shifting. In this embodiment, it is structured that the vehicle control unit 2 determines the phase at each time point in a shift operation, and the output torque of the rotary electrical machine 12, supplied oil pressure to each engagement element, and so on are controlled according to the determined phase. Details of this will be described later.

The transmission 13 shifts the rotation speed of the input shaft I with a predetermined speed ratio set to each shift speed, converts torque, and transmits the converted torque to the output shaft O. The torque transmitted from the transmission 13 to the output shaft O is distributed and transmitted to two left and right wheels 17 via a differential device 16. In this example, the vehicle drive apparatus 1 has a uniaxial structure in which the input shaft I and the output shaft O are disposed on the same axis.

2. Structure of the Vehicle Control Unit

Next, the structure of the vehicle control unit 2 according to this embodiment will be described. The vehicle control unit 2 for controlling the vehicle drive apparatus 1 functions as a core member for performing control of operation of each unit of the vehicle drive apparatus 1, as illustrated in FIG. 1. This vehicle control unit 2 has a processing device such as a CPU as a core member, and is structured including storage devices such as a RAM (Random Access Memory) structured such that the processing device can read or write data from/to the RAM, and a ROM (Read Only Memory) structured such that the processing device can read data from the ROM, and so on (not illustrated). Functional units 21 to 36 of the vehicle control unit 2 are formed by software (program) stored in the ROM and the like or hardware such as an operation circuit which is provided separately, or by both of them. These functional units 21 to 36 are structured to be capable of exchanging information with each other. This vehicle drive apparatus 1 has a plurality of sensors Se1 to Se4 provided in respective units of the vehicle 3 for achieving the functions of the functional units 21 to 36 appropriately. The functional units 21 to 36 of the vehicle control unit 2 will be described in detail below.

An engine speed sensor Se1 detects the rotation speed of the engine output shaft Eo (engine 11). A rotor rotation sensor Se2 detects a rotation position of the rotor relative to the stator of the rotary electrical machine 12. The rotor rotation sensor Se2 detects the rotation position of the rotor with very high accuracy for precisely determining a current instruction value and a current phase for driving the rotary electrical machine 12. As such a rotor rotation sensor Se2, a resolver is used in this embodiment. An output shaft rotation speed sensor Se3 detects the rotation speed of the output shaft O. Here, the output shaft O is drive-coupled to the wheels 17 only via the differential device 16, and thus the rotation speed of the output shaft O detected by the output shaft rotation speed sensor Se3 is determined in proportion to the vehicle speed. The throttle opening amount detection sensor Se4 detects an operating amount of the accelerator pedal 18 to detect a throttle opening amount. Information indicating detection results of these sensors Se1 to Se4 are outputted to the vehicle control unit 2.

An engine control unit 21 is a functional unit performing control of operation of the engine 11. The engine control unit 21 functions as an engine control mechanism. The engine control unit 21 performs processing to determine an engine operating point and control the engine 11 to operate at this engine operating point. Here, the engine operating point is a control instruction value representing a control target point of the engine 11, and is determined by a rotation speed and torque. More specifically, the engine operating point is an instruction value representing a control target point of the engine 11 determined considering required output of the vehicle and optimum fuel consumption, and is determined by a torque instruction value and a rotation speed instruction value. The engine control unit 21 controls operation of the engine 11 to make it operate with a torque and a rotation speed, which are indicated at the engine operating point.

A target shift speed determining unit 26 is a functional unit determining the target shift speed in the transmission 13. The target shift speed determining unit 26 functions as a target shift speed determining mechanism. The target shift speed determining unit 26 determines the target shift speed in the transmission 13 based on the throttle opening amount and vehicle speed of the vehicle 3. To determine such a target shift speed, the target shift speed determining unit 26 refers to a shift map stored in the not-illustrated memory. The shift map defines the relation of the throttle opening amount and the vehicle speed with the target shift speed in the transmission 13. A plurality of upshift lines and a plurality of downshift lines are set in the shift map. When the vehicle speed and the throttle opening amount change and cross an upshift line or a downshift line on the shift map, the target shift speed determining unit 26 determines a new target shift speed in the transmission 13. Here, the upshift means switching from a shift speed with a larger speed ratio (=reduction ratio; the same applies below) to a shift speed with a smaller speed ratio, and the downshift means switching from a shift speed with a smaller speed ratio to a shift speed with a larger speed ratio. The target shift speed determined by the target shift speed determining unit 26 is outputted to a switching control unit 27.

The switching control unit 27 is a functional unit controlling switching of the shift speed in the transmission 13 when the target shift speed determined by the target shift speed determining unit 26 is changed. The switching control unit 27 functions as a switching control mechanism. The switching control unit 27 switches the shift speed in the transmission 13 by controlling supplied oil pressure to the plurality of engagement elements C1, B1, . . . according to the new target shift speed. In this switching, the switching control unit 27 releases one of engagement elements that have been engaged before shifting and engages one of the engagement elements that have been released before shifting. For example, as described above, when the 3-2 downshift is performed, the switching control unit 27 releases the first clutch C1 and engages the first brake B1. In the description below, when the shift speed is switched, the engagement element on the side to be engaged after the shift speed is switched, like the first brake B1 in the 3-2 downshift, is called "engagement side element Be", and the engagement element on the side to be released after the shift speed is switched, like the first clutch C1 in the 3-2 downshift, is called "release side element Er".

Engagement of the engagement side element Ee and release of the release side element Er accompanying a change of the target shift speed are controlled by the engagement side hydraulic control unit 28 and the release side hydraulic control unit 29, which are included as subordinate functional units of the switching control unit 27. The engagement side hydraulic control unit 28 is a functional unit controlling supplied oil pressure of hydraulic oil to the engagement element on the side to be engaged (engagement side element Ee). The engagement side hydraulic control unit 28 functions as an engagement control mechanism. The engagement side hydraulic control unit 28 generates an engagement side hydraulic instruction value Ce as an instruction value of supplied oil pressure to the engagement side element Ee, and outputs this engagement side hydraulic instruction value Ce to a not-illustrated control valve corresponding to the engagement side element Ee included in the transmission 13 so as to control operation of the control valve according to the engagement side hydraulic instruction value Ce, thereby controlling the supplied oil pressure to the engagement side element Ee.

When the target shift speed is changed and the pre-control phase Pp takes place as illustrated in FIG. 2 and FIG. 3, the engagement side hydraulic control unit 28 supplies precharge oil pressure to the engagement side element Ee so as to prepare the engagement side element Ee for an engagement operation thereafter. Thereafter, when a condition that the differential rotation speed ΔN described later becomes substantially constant is met, the engagement side hydraulic control unit 28 increases the supplied oil pressure to the engagement side element Ee from the pre-control phase Pp to the torque phase Pt. At this time, the engagement side hydraulic control unit 28 increases the engagement side hydraulic instruction value Ce by a constant change rate set in advance, thereby increasing the supplied oil pressure to the engagement side element Ee by the constant change rate.

In this embodiment, the engagement side hydraulic control unit 28 feedback controls the supplied oil pressure to the engagement side element Ee in the inertia phase Pi so that the rotation acceleration of the input shaft I turns to a predetermined target rotation acceleration. In this situation, a rotary electrical machine control unit 22 performs control to keep input torque to the input shaft I from the rotary electrical machine 12 at a constant value throughout the substantially entire inertia phase Pi except an end period Pie of the shift process as will be described later, in a state that the input torque is increased or decreased by an input torque variation ΔT derived for achieving a target rotation acceleration A0 of the input shaft I, which is derived by a target rotation acceleration deriving unit 35 described later. Here, the engagement side hydraulic control unit 28 controls the supplied oil pressure to the engagement side element Ee by sequentially adjusting the engagement side hydraulic instruction value Ce so that an actual rotation acceleration A of the input shaft I derived by an input shaft rotation speed deriving unit 33 described later becomes the target rotation acceleration A0 of the input shaft I, which is derived by the target rotation acceleration deriving unit 35 described later.

Here, in the friction engagement element structured including a friction material used in this embodiment, such as the first brake B1 and the first clutch C1, the friction coefficient of the friction member does not become a constant value and may change irregularly even in one time of shift operation, due to a rotation speed difference between two rotation elements engaged with each other (including non-rotation member; the same applies below), temperatures of the friction engagement elements, and the like. Accordingly, for example, even when the engagement side hydraulic instruction value Ce is changed by a predetermined change rate set in advance, the transfer torque capacity in the engagement side element Ee does not correspond completely to the predetermined change rate set in advance and changes irregularly due to the change of the friction coefficient in practice. As a result, torque transmitted to the output shaft O may change as well.

Regarding this point, in this embodiment, the rotary electrical machine control unit 22 keeps the input torque at a constant value in a state that the input torque to the input shaft I from the rotary electrical machine 12 is increased or decreased by the predetermined input torque variation ΔT as will be described later in the inertia phase Pi. Here, in an ideal state that the transfer torque capacity in the engagement element is kept constant, the actual rotation acceleration A of the input shaft I should be kept at a constant value. Conversely, when the actual rotation speed of the input shaft I changes by a constant time change rate (rotation acceleration) according to the input torque variation ΔT, the transfer torque capacity in the engagement element should be kept substantially constant. Accordingly, in this embodiment, the engagement side hydraulic control unit 28 feedback controls the supplied oil pressure to the engagement side element Ee so that the actual rotation acceleration A of the input shaft I becomes the target rotation acceleration A0 in a state that the input torque to the input shaft I from the rotary electrical machine 12 is increased or decreased by the input torque variation ΔT, which is derived based on the target rotation acceleration A0 of the input shaft I. In this manner, the influence of an irregular change of the friction coefficient of the friction material in one time of shift operation can be absorbed by controlling the supplied oil pressure to the engagement side element Ee, thereby facilitating keeping the transfer torque capacity of the engagement side element Ee substantially constant. Therefore, a torque change of the output shaft O in a shift operation can be suppressed easily.

In this embodiment, in the end period Pie of a transmission process in the inertia phase Pi, the engagement side hydraulic control unit 28 fixes the engagement side hydraulic instruction value Ce to a constant value so that the supplied oil pressure to the engagement side element Ee is kept to a constant value. The end period Pie of the transmission process can be determined by, for example, the fact that the actual rotation speed NI of the input shaft I becomes close to an estimated rotation speed Na after shifting derived by an estimated rotation speed deriving unit 34 described later (for example, referring to FIG. 2 and FIG. 3, with reference to an estimated rotation speed Nb before shifting, the actual rotation speed NI of the input shaft I changes by 60% to 95% or more of the rotation speed difference between the estimated rotation speed Nb before shifting and the estimated rotation speed Na after shifting). Further, when the actual rotation speed NI of the input shaft I becomes equal to the estimated rotation speed Na after shifting and the actual gear ratio becomes the speed ratio of the target shift speed after shifting, the engagement side hydraulic control unit 28 increases the engagement side hydraulic instruction value Ce instantly to a complete engagement pressure.

The release side hydraulic control unit 29 is a functional unit controlling supplied oil pressure of hydraulic oil to the engagement element on the side to be released (release side element Er). The release side hydraulic control unit 29 functions as a release control mechanism. The release side hydraulic control unit 29 generates a release side hydraulic instruction value Cr as an instruction value of supplied oil pressure to the release side element Er, and outputs the release side hydraulic instruction value Cr to a not-illustrated control valve corresponding to the release side element Er included in the transmission 13 so as to control operation of the control valve according to the release side hydraulic instruction value Cr, thereby controlling the supplied oil pressure to the release side element Er.

In this embodiment, as illustrated in FIG. 2 and FIG. 3, the release side hydraulic control unit 29 feedback controls the supplied oil pressure to the release side element Er so that the differential rotation speed $\Delta N$ becomes substantially constant from the pre-control phase Pp to the torque phase Pt when supply of the precharge oil pressure to the engagement side element Ee is completed. Here, the release side hydraulic control unit 29 sequentially adjusts the release side hydraulic instruction value Cr so that the differential rotation speed $\Delta N$ derived by a differential rotation speed deriving unit 32 described later keeps a value substantially equal to a minute slip amount set in advance. The release side hydraulic control unit 29 decreases the release side hydraulic instruction value Cr to zero when end of the torque phase Pt is determined, and keeps the release side hydraulic instruction value Cr to zero as it is during the inertia phase N.

The phase determining unit 31 is a functional unit determining the phase at each time point in a shift operation. The phase determining unit 31 functions as a phase determining mechanism. The phase determining unit 31 determines as to which state the phase at each time point in a shifting operation is in, among the pre-control phase Pp, the torque phase Pt, and the inertia phase Pi. The phase state determined by the phase determining unit 31 is outputted to the rotary electrical machine control unit 22, the engagement side hydraulic control unit 28, and the release side hydraulic control unit 29, and control by each functional unit in each phase is executed.

Here, "being in a shift operation" refers to a period from a time point when the target shift speed is changed in the transmission 13 to a time point when the actual gear ratio becomes the speed ratio of the target shift speed after shifting.

In this embodiment, the phase determining unit 31 is structured to determine the phase state at each time point in the shift operation by determining timings of start and end of the torque phase Pt in the shift operation. That is, the phase determining unit 31 determines as the pre-control phase Pp a period from start of a shift operation (=time point when the target shift speed is changed in the transmission 13) until start of the torque phase Pt is determined; determines as the torque phase Pt a period from determination of start of the torque phase Pt until end of the torque phase Pt is determined; and determines as the inertia phase Pi a period from determination of end of the torque phase Pt until finish of the shift operation (=time point when the actual gear ratio becomes the speed ratio of the target shift speed after shifting). Next, methods of determining timings of start and end of the torque phase Pt by the phase determining unit 31 will be described.

First, a method of determining the timing of start of the torque phase Pt will be described. As described above, in the pre-control phase Pp, the release side hydraulic control unit 29 starts to feedback control the supplied oil pressure to the release side element Er so that the differential rotation speed $\Delta N$ becomes substantially constant. Here, the rotation speed of the input shaft I changes in a direction away from the estimated rotation speed Na after shifting with respect to the estimated rotation speed Nb before shifting (decreases in downshift and increases in upshift), as illustrated in FIG. 2 and FIG. 3. This corresponds to the fact that the actual gear ratio changes in a direction away from the speed ratio of the target shift speed after shifting with respect to the speed ratio of the target shift speed before shifting. After the differential rotation speed $\Delta N$ turns to a substantially constant state, the engagement side hydraulic control unit 28 increases the supplied oil pressure to the engagement side element Ee by a constant change rate. Meanwhile, the feedback control by the release side hydraulic control unit 29 is performed continuously and constantly. In a state that the supplied oil pressure to the engagement side element Ee is not higher than stroke end pressure, the engagement side element Ee will have no transfer torque capacity. Thus, the feedback control system by the release side hydraulic control unit 29 is kept stationery, and the differential rotation speed $\Delta N$ is also kept in the substantially constant state. When the supplied oil pressure to the engagement side element Ee increases and then reaches the stroke end pressure, the engagement side element Ee starts to have a transfer torque capacity, and the torque phase Pt actually starts.

Increase of the transfer torque capacity in the engagement side element Ee operates as an external disturbance on the feedback control system by the release side hydraulic control unit 29. That is, increase of the transfer torque capacity in the engagement side element Ee causes the actual rotation speed NI of the input shaft Ito change (increase in downshift and decrease in upshift), and thus the differential rotation speed $\Delta N$ is also caused to change (decrease in either of downshift and upshift). In this manner, in a state that the supplied oil pressure to the release side element Er is feedback controlled so that the differential rotation speed $\Delta N$ becomes substantially constant, a change occurs in the differential rotation speed $\Delta N$ due to increase of the supplied oil pressure to the engagement side element Ee. A timing when such a change occurs in the differential rotation speed $\Delta N$ corresponds one-to-one to the actual start timing of the torque phase Pt.

Accordingly, the phase determining unit 31 determines that the torque phase Pt has started when a condition that a phenomenon accompanying a change of the differential rotation speed $\Delta N$ due to increase of the supplied oil pressure to the engagement side element Ee is detected is met. Here, when the actual rotation speed NI of the input shaft I changes (increases in downshift and decreases in upshift) and the differential rotation speed $\Delta N$ decreases, the release side hydraulic control unit 29 feedback controls the supplied oil pressure to the release side element Er so as to cancel out this change. This causes the actual rotation speed NI of the input shaft I to further change (decrease in downshift and increase in upshift) in the opposite direction, and the differential rotation speed $\Delta N$ increases and returns to the original state. That is, since the supplied oil pressure to the release side element Er is feedback controlled by the release side hydraulic control unit 29 so that the differential rotation speed $\Delta N$ becomes substantially constant, the differential rotation speed $\Delta N$ decreases temporarily from the substantially constant state, and thereafter returns to the original state again as illustrated by outline arrows in FIG. 2 and FIG. 3. In this state, the supplied oil pressure to the engagement side element Ee is increased continuously, and thus the release side hydraulic control unit 29 decreases the release side hydraulic instruction value Cr largely to decrease the supplied oil pressure to the release side element Er largely, so as to keep the differential rotation speed $\Delta N$ in the original state as it is, as illustrated by bold arrows in FIG. 2 and FIG. 3. Therefore, in this embodiment, the phenomenon accompanying a change of the differential rotation speed $\Delta N$ includes a change over time of the differential rotation speed $\Delta N$ itself and a change over time of the release side hydraulic instruction value Cr.

Accordingly, in this embodiment, the phase determining unit 31 detects two phenomena:

(1) decrease of the differential rotation speed $\Delta N$ by a predetermined start determining differential rotation speed $\Delta N0$ or more from the substantially constant state, and (2) decrease of the release side hydraulic instruction value Cr by a predetermined start determining variation $\Delta Cr0$ or more with reference to a value when the differential rotation speed $\Delta N$ is in a substantially constant state, which are phenomena accompanying a change of the differential rotation speed $\Delta N$ due to increase of the supplied oil pressure to the engagement side element Ee. The phase determining unit 31 determines that the torque phase Pt has started when there is met either of conditions that the decrease of differential rotation speed $\Delta N$ by the predetermined start determining differential rotation speed $\Delta N0$ or more from the substantially constant state is detected, and that decrease of the release side hydraulic instruction value Cr by the predetermined start determining variation $\Delta Cr0$ or more with reference to the value when the differential rotation speed $\Delta N$ is in a substantially constant state is detected.

Here, the reason that the phenomenon (1) is detected is because the phenomenon (1) appears first corresponding one-to-one to the actual start timing of the torque phase Pt. By determining that the torque phase Pt has started when the condition that the phenomenon (1) is detected is met, start of the torque phase Pt in a shift operation can be determined very accurately. As the start determining differential rotation speed $\Delta N0$, there may be set a value to a degree that it is possible to appropriately determine that the feedback control system by the release side hydraulic control unit 29 is affected by increase of the transfer torque capacity in the engagement side element Ee, and the differential rotation speed $\Delta N$ is decreased. For example, an integrated value of a predetermined coefficient set in advance based on an experiment and the like and the differential rotation speed $\Delta N$ can be taken as the start determining differential rotation speed $\Delta N0$. However, since the phenomenon (1) appears only once in a shift operation and disappears relatively early by operation of the feedback control system by the release side hydraulic control unit 29, a possibility to fail in detecting this phenomenon cannot be denied. Particularly, when response of control of the feedback control system by the release side hydraulic control unit 29 is set high, the width of decrease of the differential rotation speed $\Delta N$ becomes quite small, and it is possible that this decrease cannot be detected. In this point, since the release side hydraulic instruction value Cr does not increase and just decreases, the variation of the release side hydraulic instruction value Cr with reference to a predetermined value changes in one direction and just increases. Therefore, detection of this change is always possible, and it is not possible that detecting this change fails. Accordingly, by detecting the phenomenon (2) and determining that the torque phase Pt has started when a condition that the phenomenon (2) is detected is met, start of the torque phase Pt in a shift operation can be accurately and surely determined.

Next, a method of determining a timing of end of the torque phase Pt will be described. As described above, the time point of end of the torque phase Pt is a time point when the actual gear ratio starts to change toward the side of the speed ratio of the target shift speed after shifting rather than the speed ratio of the target shift speed before shifting. Here, feedback control of the supplied oil pressure to the release side element Er is performed so that the differential rotation speed $\Delta N$ becomes substantially constant during the torque phase Pt, and the actual gear ratio changes in a direction away from the speed ratio of the target shift speed after shifting with respect to the speed ratio of the target shift speed before shifting. Therefore, in this embodiment, the time point of end of the torque phase Pt is a time point when, after the actual gear ratio has changed to the side of the speed ratio of the target shift speed after shifting, the actual gear ratio becomes equal to the speed ratio of the target shift speed before shifting and starts to change toward the side of the speed ratio of the target shift speed after shifting with respect to the speed ratio of the target shift speed before shifting.

When the engagement side hydraulic control unit 28 keeps increasing the supplied oil pressure to the engagement side element Ee by the constant change rate in a state that the release side hydraulic control unit 29 constantly performs the feedback control continuously, soon the supplied oil pressure to the release side element Er becomes equal to or lower than the stroke end pressure, and the release side element Er no longer has the transfer torque capacity. Then, change of the actual rotation speed NI of the input shaft I (increase in downshift and decrease in upshift) can no longer be absorbed by the feedback control system by the release side hydraulic control unit 29. The differential rotation speed $\Delta N$ becomes zero at this time point, and the actual gear ratio starts to change toward the side of the speed ratio of the target shift speed after shifting rather than the speed ratio of the target shift speed before shifting.

The phase determining unit 31 then determines that the torque phase Pt has ended when the following condition is met: change of the release side hydraulic instruction value Cr to be equal to or smaller than a predetermined release determining value Cr1 corresponding to the oil pressure at which the transfer torque capacity in the release side element Er becomes zero is detected. The value corresponding to oil pressure equal to or smaller than the stroke end pressure, which is oil pressure at which the transfer torque capacity in the release side element Er becomes zero, is set to such a release determining value Cr1. In this embodiment, the value corresponding to the stroke end pressure which is the maximum value of the oil pressure at which the transfer torque capacity in the release side element Er becomes zero is set to the release determining value. In this embodiment, the release side hydraulic control unit 29 constantly performs the feedback control continuously in the torque phase Pt as described above, by which the release side hydraulic instruction value Cr is updated sequentially. Using the release side hydraulic instruction value Cr which is updated sequentially, end of the torque phase Pt in a shift operation can be determined very accurately.

In this embodiment, when decrease of the differential rotation speed ΔN to zero after start of the torque phase Pt is determined is detected, the phase determining unit 31 determines that the torque phase Pt has ended even when it is before the release side hydraulic instruction value Cr becomes equal to or lower than the release determining value Cr1. This is because, as described above, the time point when the differential rotation speed ΔN decreases to zero is assumed to be the time point of end of the torque phase Pt in this embodiment. Further, in this embodiment, also when change of the engagement side hydraulic instruction value Ce to be equal to or larger than a predetermined end determining value Ce1 set in advance is detected, the phase determining unit 31 determines that torque phase Pt has ended even when it is before the release side hydraulic instruction value Cr becomes equal to or smaller than the release determining value Cr1. It is preferred that a learned value of the engagement side hydraulic instruction value Ce at a time point when the release side hydraulic instruction value Cr becomes the release determining value Cr1 (here, this value is assumed as an engagement side hydraulic instruction value Ce2 when completely released) be set to such an end determining value Ce1. Such a learned value can be, for example, an average value of plural engagement side hydraulic instruction values Ce2 when completely released which are stored in the not-illustrated memory or the like.

Thus, in this embodiment, the phase determining unit 31 determines that the torque phase Pt has ended when one of the following conditions is met: (A) change of the release side hydraulic instruction value Cr to be equal to or smaller than the predetermined release determining value Cr1 is detected; (B) decrease of the differential rotation speed ΔN to zero after it is determined that the torque phase Pt has started is detected; and (C) change of the engagement side hydraulic instruction value Ce to be equal to or larger than the predetermined end determining value Ce1 set in advance is detected. In this manner, end of the torque phase Pt in a shift operation can be determined surely and accurately.

The differential rotation speed deriving unit 32 is a functional unit deriving the differential rotation speed ΔN which is the difference in rotation speed between the actual rotation speed NI of the input shaft I and the predetermined target rotation speed. The differential rotation speed deriving unit 32 functions as a differential rotation speed deriving mechanism. In this embodiment, the actual rotation speed NI of the input shaft I is derived by the input shaft rotation speed deriving unit 33. As the predetermined target rotation speed, an estimated rotation speed of the input shaft I before shifting (before the target shift speed is changed) (=estimated rotation speed Nb before shifting) is set. The estimated rotation speed Nb before shifting is derived by the estimated rotation speed deriving unit 34. In this embodiment, the differential rotation speed deriving unit 32 subtracts the estimated rotation speed Nb before shifting derived by the estimated rotation speed deriving unit 34 from the actual rotation speed NI of the input shaft I derived by the input shaft rotation speed deriving unit 33, and derives the differential rotation speed ΔN as the absolute value of the obtained result. The differential rotation speed ΔN derived by the differential rotation speed deriving unit 32 is outputted to the engagement side hydraulic control unit 28, the release side hydraulic control unit 29, and the phase determining unit 31.

The input shaft rotation speed deriving unit 33 is a functional unit deriving the actual rotation speed NI of the input shaft I. The input shaft rotation speed deriving unit 33 functions as an input shaft rotation speed deriving mechanism. The input shaft rotation speed deriving unit 33 derives the rotation speed NI of the input shaft I by deriving the actual rotation speed of the rotor of the rotary electrical machine 12 based on information of the rotational position of the rotor detected by the rotor rotation sensor Se2. Here, since the input shaft I is integrally drive-coupled to the rotor of the rotary electrical machine 12, the rotation speed of the rotor of the rotary electrical machine 12 matches the rotation speed NI of the input shaft I. In this embodiment, a resolver is used as the rotor rotation sensor Se2 as described above, and the rotation position of the rotor of the rotary electrical machine 12 is detected with very high accuracy. Therefore, the input shaft rotation speed deriving unit 33 can derive the actual rotation speed NI of the input shaft I with very high accuracy. Accordingly, also the differential rotation speed deriving unit 32 can derive the differential rotation speed ΔN with very high accuracy. In this embodiment, the input shaft rotation speed deriving unit 33 is structured to further derive the actual rotation acceleration A of the input shaft I. Of course, the input shaft rotation speed deriving unit 33 can derive the actual rotation acceleration A of the input shaft I also with very high accuracy. The rotation speed NI of the input shaft I derived by the input shaft rotation speed deriving unit 33 is outputted to the phase determining unit 31, the differential rotation speed deriving unit 32, and so on. The rotation acceleration A of the input shaft I is outputted to the engagement side hydraulic control unit 28.

The estimated rotation speed deriving unit 34 is a functional unit deriving the estimated rotation speed of the input shaft I based on the rotation speed of the output shaft O and the speed ratio of the target shift speed set in the transmission 13. The estimated rotation speed deriving unit 34 functions as an estimated rotation speed deriving mechanism. In this embodiment, the estimated rotation speed deriving unit 34 derives the estimated rotation speed Nb before shifting, which is the estimated rotation speed of the input shaft I before the target shift speed is changed, and the estimated rotation speed Na after shifting, which is the estimated rotation speed of the input shaft I after the target shift speed is changed. Here, the estimated rotation speed Nb before shifting is derived based on the rotation speed of the output shaft O detected by the output shaft rotation speed sensor Se3 and the speed ratio of the target shift speed of the transmission 13 before shifting (before the target shift speed is changed). Specifically, the estimated rotation speed Nb before shifting is derived as a multiplication value of the rotation speed of the output shaft O and the speed ratio of the target shift speed before shifting. The estimated rotation speed Na after shifting is derived based on the rotation speed of the output shaft O and the speed ratio of the target shift speed of the transmission 13 after shifting (after the target shift speed is changed). Specifically, the estimated rotation speed Na after shifting is derived as a multiplication value of the rotation speed of the output shaft O and the speed ratio of the target shift speed after shifting. The estimated rotation speed Nb before shifting and the estimated rotation speed Na after shifting derived by the estimated rotation speed deriving unit 34 are outputted to the differential rotation speed deriving unit 32, and so on.

The target rotation acceleration deriving unit 35 is a functional unit deriving the target rotation acceleration (=target rotation speed change rate) A0 which is a target value of the rotation acceleration (rotation speed change rate) A of the input shaft I. The target rotation acceleration deriving unit 35 functions as a target rotation acceleration deriving mechanism (a target rotation speed change rate deriving mechanism). The target rotation acceleration A0 of the input shaft I is derived based on the estimated rotation speed Na after shifting and the estimated rotation speed Nb before shifting so that the inertia phase Pi can be completed in a target time TPi. Specifically, the target rotation acceleration A0 is derived as a division value obtained by dividing the subtraction value obtained by subtracting the estimated rotation speed Nb before shifting from the estimated rotation speed Na after shifting by the target time TPi (corresponding to the time period from time T4 to time T6 in FIG. 2 and FIG. 3) of the inertia phase Pi. In this case, the target rotation acceleration A0 of the input shaft I becomes a constant value. The target rotation acceleration A0 of the input shaft I derived by the target rotation acceleration deriving unit 35 is outputted to an input torque variation deriving unit 36 and the engagement side hydraulic control unit 28.

The input torque variation deriving unit 36 is a functional unit deriving the input torque variation ΔT which is a variation of torque of the input shaft I needed for changing the actual rotation acceleration A of the input shaft I to the target rotation acceleration A0. The input torque variation deriving unit 36 functions as an input torque variation deriving mechanism. In this embodiment, as will be described later, input torque to the input shaft I is increased or decreased by the predetermined input torque variation ΔT throughout the substantially entire inertia phase Pi. In this case, in an ideal state that the transfer torque capacity in the engagement element is kept constant, the rotation acceleration A of the input shaft I is determined according to the input torque variation ΔT, and conversely, the input torque variation ΔT is determined according to the rotation acceleration A of the input shaft I. Thus, the input torque variation deriving unit 36 derives the input torque variation ΔT based on the target rotation acceleration A0 of the input shaft I derived by the target rotation acceleration deriving unit 35. Specifically, given that the rotation inertia of the input shaft I is known, the input torque variation ΔT is derived by multiplying the target rotation acceleration A0 of the input shaft I derived by the target rotation acceleration deriving unit 35 by rotation inertia of the input shaft I. Since the rotation acceleration A of the input shaft I is a constant value, the input torque variation ΔT is a constant value as well. The input torque variation ΔT derived by the input torque variation deriving unit 36 is outputted to the rotary electrical machine control unit 22.

The rotary electrical machine control unit 22 is a functional unit performing control of operation of the rotary electrical machine 12. The rotary electrical machine control unit 22 functions as a rotary electrical machine control mechanism. The rotary electrical machine control unit 22 performs processing to determine a rotary electrical machine operating point and control the rotary electrical machine 12 to operate at this rotary electrical machine operating point. Here, the rotary electrical machine operating point is a control instruction value representing a control target point of the rotary electrical machine 12, and is determined by a rotation speed and torque. More specifically, the rotary electrical machine operating point is an instruction value representing a control target point of the rotary electrical machine 12 determined considering required output of the vehicle, regeneration torque in regeneration braking, and a transmitted torque variation to the output shaft O in a shift operation, or the like, and is determined by a torque instruction value and a rotation speed instruction value. The rotary electrical machine control unit 22 controls operation of the rotary electrical machine so that the rotary electrical machine 12 operates with a torque and at a rotation speed, which are indicated at the rotary electrical machine operating point.

In this embodiment, the vehicle drive apparatus 1 is a hybrid drive apparatus which is drive-coupled to the engine 11 and has the rotary electrical machine 12 as a driving force source. In such a hybrid drive apparatus, the rotary electrical machine 12 powers the vehicle or performs regeneration frequently depending on the traveling state of the vehicle 3. Thus, in the following, an example will be described in which the present invention is applied in a situation that the shift speed is switched by the transmission 13 in a state that the rotary electrical machine 12 outputs torque (driving torque in the same direction as the rotational direction, or regeneration torque in the opposite direction to the rotational direction).

In this embodiment, the rotary electrical machine control unit 22 changes torque of the rotary electrical machine 12 by a variation corresponding to a variation of the supplied oil pressure to the engagement side element Ee in the torque phase Pt. FIG. 2 is a time chart for switching from a shift speed with a smaller speed ratio (=reduction ratio) to a shift speed with a larger speed ratio (which may be hereinafter referred to as a regeneration downshift) by the transmission 13 in a state that the rotary electrical machine 12 is outputting regeneration torque to perform regeneration. As illustrated in FIG. 2, when the regeneration downshift is performed, the rotary electrical machine control unit 22 increases input torque by a variation corresponding to a variation of the supplied oil pressure to the engagement side element Ee in the torque phase Pt. In this embodiment, the supplied oil pressure to the engagement side element Ee is increased gradually by the constant change rate, and thus the rotary electrical machine control unit 22 increases the input torque gradually by the constant change rate corresponding to this increase. In this case, the regeneration torque decreases gradually by the constant change rate.

On the other hand, FIG. 3 is a time chart for switching from a shift speed with a larger speed ratio (=reduction ratio) to a shift speed with a smaller speed ratio (which may be hereinafter referred to as a power-on upshift) by the transmission 13 in a state that the rotary electrical machine 12 is outputting driving torque to power the vehicle. As illustrated in FIG. 3, when the power-on upshift is performed, the rotary electrical machine control unit 22 increases input torque by a variation corresponding to a variation of the supplied oil pressure to the engagement side element Ee in the torque phase Pt. In this embodiment, the supplied oil pressure to the engagement side element Ee is increased gradually by the constant change rate, and thus the rotary electrical machine control unit 22 increases the input torque gradually by the constant change rate corresponding to this increase. In this case, the driving torque increases gradually by the constant change rate.

In this embodiment, the rotary electrical machine control unit 22 controls the torque of the rotary electrical machine 12 so as to increase or decrease the input torque to the input shaft I in the inertia phase Pi according to the direction of switching the shift speed. At this time, the rotary electrical machine control unit 22 controls the torque of the rotary electrical machine 12 to increase or decrease by the predetermined input torque variation ΔT with reference to the magnitude of the input torque at the time point of end of the torque phase Pt. Here, during a downshift, the rotary electrical machine control unit 22 controls the torque of the rotary electrical machine 12 so as to increase the input torque to the input shaft I. For example, during the regeneration downshift illustrated in FIG. 2, negative torque (regeneration torque) is inputted as the input torque from the rotary electrical machine 12 to the input shaft I, and thus the rotary electrical machine control unit 22 controls the torque of the rotary electrical machine 12 so as to decrease the regeneration torque by the predetermined input torque variation ΔT by increasing the input torque.

On the other hand, during an upshift, the rotary electrical machine control unit 22 controls the torque of the rotary electrical machine 12 so as to decrease the input torque to the input shaft I. For example, during the power-on upshift illustrated in FIG. 3, positive torque (driving torque) is inputted as the input torque from the rotary electrical machine 12 to the input shaft I, and thus the rotary electrical machine control unit 22 controls the torque of the rotary electrical machine 12 so as to decrease the driving torque by the predetermined input torque variation ΔT by decreasing the input torque.

The rotary electrical machine control unit 22 also controls the torque of the rotary electrical machine 12 so as to keep the input torque at a constant value in a state that the input torque is increased or decreased by the predetermined input torque variation ΔT throughout the substantially entire inertia phase Pi excluding the end period Pie of the transmission process. When the end period Pie comes up shortly, in a state that the supplied oil pressure to the engagement side element Ee is kept at a constant value (a state that the engagement side hydraulic instruction value Ce is fixed to a constant value), the rotary electrical machine control unit 22 then feedback controls the torque of the rotary electrical machine 12 so as to synchronize the actual rotation speed NI of the input shaft I derived by the input shaft rotation speed deriving unit 33 with the estimated rotation speed Na after shifting derived by the estimated rotation speed deriving unit 34. In this manner, it is possible to change the actual rotation speed NI of the input shaft I smoothly to be close to the estimated rotation speed Na after shifting, and effectively suppress occurrence of shift shock when the engagement side element Ee is brought to a completely engaged state when the shift operation finishes.

3. Procedure of Vehicle Control Processing

Figure 4:
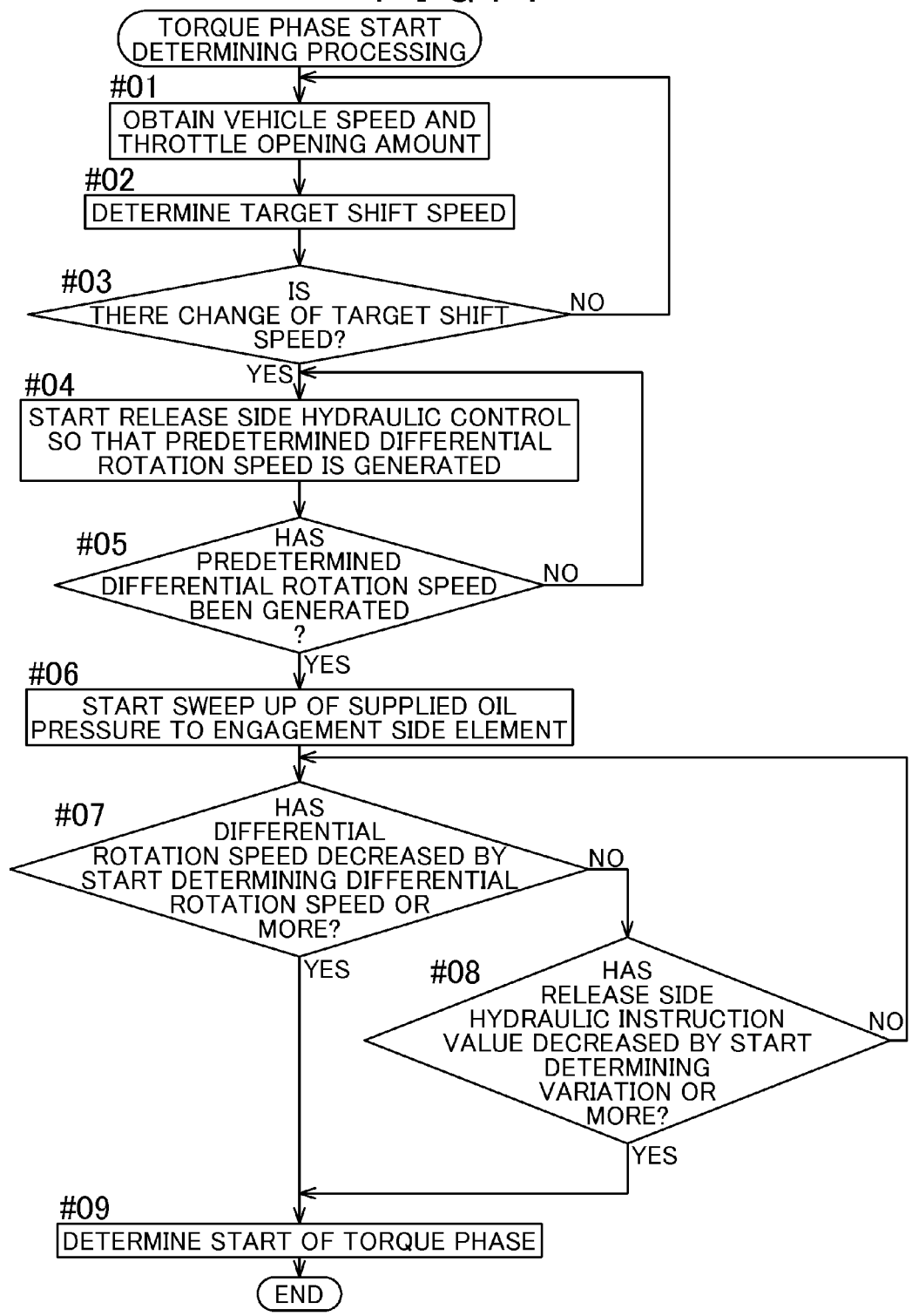
FIG. 4 is a flowchart illustrating a processing procedure of torque phase start determining processing.
Figure 5:
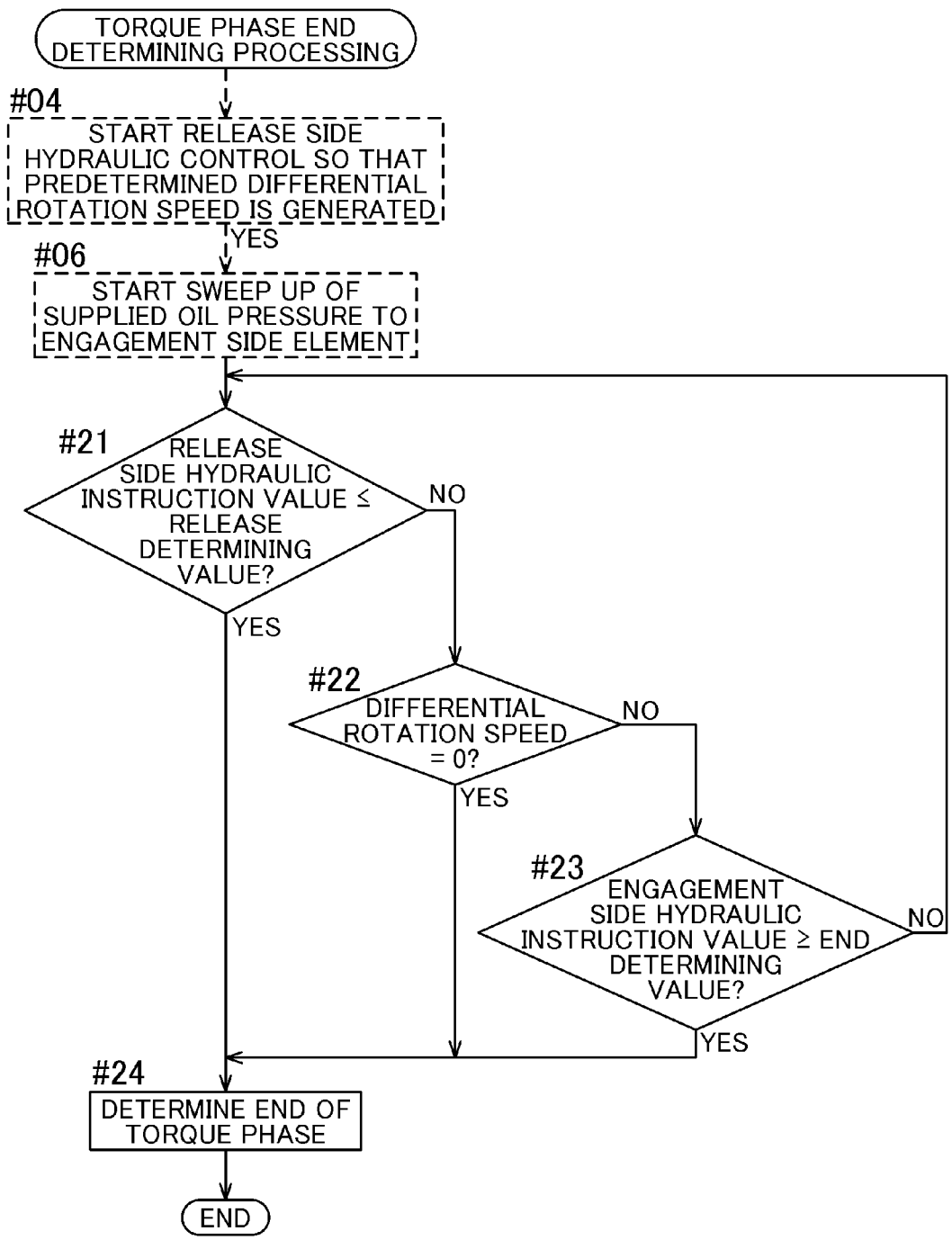
FIG. 5 is a flowchart illustrating a processing procedure of torque phase end determining processing.

Next, the contents of vehicle control processing according to this embodiment will be described with reference to flowcharts of FIG. 4 to FIG. 6 and time charts of FIG. 2 and FIG. 3. The vehicle control processing according to this embodiment is structured including torque phase start determining processing, torque phase end determining processing, and shift operation control processing. FIG. 4 is a flowchart illustrating a processing procedure of the torque phase start determining processing. FIG. 5 is a flowchart illustrating a processing procedure of the torque phase end determining processing. FIG. 6 is a flowchart illustrating a processing procedure of the shift operation control processing. FIG. 2 is a time chart for performing the regeneration downshift, and FIG. 3 is a time chart for performing the power-on upshift. The respective procedures of the vehicle control processing to be described below are carried out by the respective functional units of the vehicle control unit 2. When the functional units are formed from a program, the processing device included in the vehicle control unit 2 operates as a computer executing the program forming the functional units described above.

3-1. Procedure of the Torque Phase Start Determining Processing

In the torque phase start determining processing according to this embodiment, first the target shift speed determining unit 26 obtains a vehicle speed and a throttle opening amount (step #01). Here, the throttle opening amount is detected and obtained by the throttle opening amount detection sensor Se4, and the vehicle speed is obtained by multiplying the rotation speed of the output shaft O detected by the output shaft rotation speed sensor Se3 by a predetermined factor of proportionality (generally a final reduction ratio). The target shift speed determining unit 26 determines a target shift speed based on the obtained vehicle speed and throttle opening amount (step #02). The processing above is carried out sequentially and repeatedly while the target shift speed is not changed (step #03: No). When the target shift speed is changed (step #03: Yes), the release side hydraulic control unit 29 starts feedback control of the supplied oil pressure to the release side element Er so that the predetermined differential rotation speed ΔN is generated at time T1 in the pre-control phase Pp and that the differential rotation speed ΔN becomes substantially constant (step #04). The feedback control of the supplied oil pressure to the release side element Er by the release side hydraulic control unit 29 is performed continuously until time T4 at which the torque phase Pt ends.

When the predetermined differential rotation speed ΔN is generated and becomes substantially constant (step #05: Yes), the engagement side hydraulic control unit 28 starts a sweep up of the supplied oil pressure to the engagement side element Ee at time T2 (step #06). That is, the engagement side hydraulic control unit 28 increases the engagement side hydraulic instruction value Ce by the constant change rate set in advance to increase the supplied oil pressure to the engagement side element Ee by the constant change rate. The sweep up of the supplied oil pressure to the engagement side element Ee by the engagement side hydraulic control unit 28 is performed continuously until time T4 at which the torque phase Pt ends.

In a state that the feedback control of the supplied oil pressure to the release side element Er by the release side hydraulic control unit 29 and the sweep up of the supplied oil pressure to the engagement side element Ee by the engagement side hydraulic control unit 28 are performed simultaneously, the phase determining unit 31 monitors the differential rotation speed ΔN derived by the differential rotation speed deriving unit 32, and further monitors the release side hydraulic instruction value Cr from the release side hydraulic control unit 29. In this state, the phase determining unit 31 determines whether or not the differential rotation speed ΔN has decreased from the substantially constant state by the predetermined start determining differential rotation speed ΔN0 or more (step #07). During a period in which it is not detected that the differential rotation speed ΔN has decreased temporarily from the substantially constant state (step #07: No), the phase determining unit 31 determines whether the release side hydraulic instruction value Cr has decreased by the predetermined start determining variation ΔCr0 or more with reference to the value when the differential rotation speed ΔN is in a substantially constant state (step #08). When it is determined that the decrease of the release side hydraulic instruction value Cr is smaller than the start determining variation ΔCr0 (step #08: No), the processing returns to step #07 again to carry out the processing of step #07 and step #08 repeatedly.

When it is detected that the differential rotation speed ΔN has decreased by the predetermined start determining differential rotation speed ΔN0 or more from the substantially constant state as illustrated by outline arrows in FIG. 2 and FIG. 3 (step #07: Yes), or when the release side hydraulic instruction value Cr decreases largely and it is determined that the decrease of the release side hydraulic instruction value Cr has become equal to or more than the start determining variation ΔCr0 as illustrated by bold arrows in FIG. 2 and FIG. 3 (step #08: Yes), the phase determining unit 31 determines that the torque phase Pt has started (step #09) at this time point (time T3 in this example) and finishes the torque phase start determining processing. In FIG. 2 and FIG. 3, the start determining variation ΔCr0 is shown largely in consideration of visibility. However, in practice, a value to the degree by which start of the torque phase Pt can be determined appropriately is set, and the start determining variation ΔCr0 is a sufficiently small value compared to the release side hydraulic instruction value Cr in a state that the differential rotation speed ΔN is substantially constant.

3-2. Procedure of the Torque Phase End Determining Processing

In the torque phase end determining processing according to this embodiment, the feedback control of the supplied oil pressure to the release side element Er by the release side hydraulic control unit 29 started in step #04 of the torque phase start determining processing and the sweep up of the supplied oil pressure to the engagement side element Ee by the engagement side hydraulic control unit 28 started in step #06 are still performed continuously. For showing this point by way of confirmation, the flowchart of FIG. 5 shows the processing blocks of step #04 and step #06 in the torque phase start determining processing by dashed lines. After it is determined that the torque phase Pt has started, in a state that the feedback control of the supplied oil pressure to the release side element Er by the release side hydraulic control unit 29 and the sweep up of the supplied oil pressure to the engagement side element Ee by the engagement side hydraulic control unit 28 are performed in parallel, the phase determining unit 31 monitors the engagement side hydraulic instruction value Ce from the engagement side hydraulic control unit 28, the release side hydraulic instruction value Cr from the release side hydraulic control unit 29, and the differential rotation speed ΔN derived by the differential rotation speed deriving unit 32.

In this state, first the phase determining unit 31 determines whether or not the release side hydraulic instruction value Cr is equal to or smaller than the predetermined release determining value Cr1 (step #21). Here, in this embodiment, the predetermined release determining value Cr1 is set to a value corresponding to the stroke end pressure in the release side element Er. When it is determined that the release side hydraulic instruction value Cr is larger than the release determining value Cr1 (step #21: No), then the phase determining unit 31 determines whether the differential rotation speed ΔN has decreased to zero or not (step #22). When it is determined that the differential rotation speed ΔN has not become zero yet (step #22: No), then the phase determining unit 31 determines whether or not the engagement side hydraulic instruction value Ce is equal to or more than the predetermined end determining value Ce1 set in advance (step #23). Here, the predetermined end determining value Ce1 in this embodiment is a learned value of the engagement side hydraulic instruction value Ce at the time point when the release side hydraulic instruction value Cr becomes the stroke end pressure equivalent value Cr1. When it is determined that the engagement side hydraulic instruction value Ce is smaller than the end determining value Ce1 (step #23: No), the processing returns again to step #21 to carry out the processing of step #21 to step #23 repeatedly.

When it is determined that the release side hydraulic instruction value Cr is equal to or lower than the release determining value Cr1 (step #21: Yes), when it is determined that the differential rotation speed ΔN has decreased to zero (step #22: Yes), or when it is determined that the engagement side hydraulic instruction value Ce is equal to or larger than the end determining value Ce1 (step #23: Yes), the phase determining unit 31 determines that the torque phase Pt has ended by this time point (at time T4 in this example) (step #24), and finishes the torque phase end determining processing. FIG. 2 and FIG. 3 illustrate examples in which all the three determination conditions are met simultaneously at time T4.

3-3. Procedure of the Shift Operation Control Processing

In the shift operation control processing according to this embodiment, results of the torque phase start determining processing and torque phase end determining processing which have been described are used. In the shift operation control processing, when the phase determining unit 31 determines that the torque phase Pt has started in step #09 (step #31: Yes), the rotary electrical machine control unit 22 changes the torque of the rotary electrical machine 12 by a variation corresponding to a variation of the supplied oil pressure to the engagement side element Ee throughout the entire torque phase Pt from time T3 to time T4 (step #32). In this embodiment, since the supplied oil pressure to the engagement side element Ee is increased by the constant change rate, the rotary electrical machine control unit 22 changes the torque of the rotary electrical machine 12 by the constant change rate corresponding thereto. Specifically, during the regeneration downshift illustrated in FIG. 2, the rotary electrical machine control unit 22 decreases the regeneration torque of the rotary electrical machine 12 by the constant change rate. On the other hand, during the power-on upshift illustrated in FIG. 3, the rotary electrical machine control unit 22 increases the driving torque of the rotary electrical machine 12 by the constant change rate.

Next, when the phase determining unit 31 determines that the torque phase Pt has ended in step #24 (step #41: Yes), the target rotation acceleration deriving unit 35 derives the target rotation acceleration A0 of the input shaft I according to switching of the shift speed so that the inertia phase Pi is completed in the target time TPi (step #42-1). The input torque variation deriving unit 36 derives the input torque variation ΔT based on the target rotation acceleration A0 of the input shaft I (step #42-2). The rotary electrical machine control unit 22 increases or decreases the input torque inputted to the input shaft I at time T4 by the predetermined input torque variation ΔT according to the switching direction of the shift speed (downshift or upshift) (step #43). By increasing or decreasing the input torque inputted to the input shaft I by the input torque variation ΔT, the inertia phase Pi starts. During the regeneration downshift illustrated in FIG. 2, the rotary electrical machine control unit 22 increases the input torque and decreases the regeneration torque by the predetermined input torque variation ΔT. On the other hand, during the power-on upshift illustrated in FIG. 3, the rotary electrical machine control unit 22 decreases the input torque to decrease the driving torque by the predetermined input torque variation ΔT.

When a predetermined delay time elapses from when end of the torque phase Pt is determined (step #44: Yes), the engagement side hydraulic control unit 28 then controls the supplied oil pressure to the engagement side element Ee so that the actual rotation acceleration A of the input shaft I becomes the target rotation acceleration A0 of the input shaft I (step #45). This control of the supplied oil pressure to the engagement side element Ee by the engagement side hydraulic control unit 28 is performed continuously until the end period Pie of the shift process in which the actual rotation speed NI of the input shaft I becomes close to the estimated rotation speed Na after shifting. In the end period Pie of the shift process after time T5 (step #46: Yes), the engagement side hydraulic control unit 28 fixes the engagement side hydraulic instruction value Ce to a constant value and keeps the supplied oil pressure to the engagement side element Ee at a constant value (step #47). In this state, the rotary electrical machine control unit 22 feedback controls the torque of the rotary electrical machine 12 so as to synchronize the actual rotation speed NI of the input shaft I with the estimated rotation speed Na after shifting (step #48). When the actual rotation speed NI of the input shaft I is synchronized with the estimated rotation speed Na after shifting at time T6 (step #49: Yes), the engagement side hydraulic control unit 28 increases the engagement side hydraulic instruction value Ce to the complete engagement pressure instantly and turns the engagement side element to a completely engaged state (step #50).

Thus, the shift operation control processing is finished.

[Other Embodiments]

(1) In the example explained in the above-described embodiment, the target rotation acceleration deriving unit 35 derives the target rotation acceleration A0 of the input shaft I which is a constant value, and the rotary electrical machine control unit 22 controls the torque of the rotary electrical machine 12 so as to increase or decrease the input torque by the input torque variation $\Delta T$, which is derived based on the target rotation acceleration A0 of the input shaft I and is a constant value, according to the direction of switching of shift speeds throughout the substantially entire inertia phase Pi. However, embodiments of the present invention is not limited to this. Specifically, another preferred embodiment of the present invention is structured such that, for example, the target rotation acceleration deriving unit 35 derives the target rotation acceleration A0 of the input shaft I which increases or decreases by a constant time change rate, and the rotary electrical machine control unit 22 controls the torque of the rotary electrical machine 12 so as to increase or decrease the input torque by a constant time change rate according to the direction of switching of shift speeds throughout the substantially entire inertia phase Pi. For example, it is possible to employ a structure such that the target rotation acceleration A0 of the input shaft I derived by the target rotation acceleration deriving unit 35 is decreased gradually from the time point of start of the inertia phase Pi to the time point of end thereof. In this structure, the rotary electrical machine control unit 22 gradually decreases the input torque variation $\Delta T$ derived based on the target rotation acceleration A0 from the time point of start of the inertia phase Pi to the time point of end thereof.

(2) In the example explained in the above-described embodiment, the rotary electrical machine control unit 22 feedback controls the torque of the rotary electrical machine 12 so as to synchronize the actual rotation speed NI of the input shaft I with the estimated rotation speed Na after shifting in the end period Pie of a shift process. However, embodiments of the present invention are not limited to this. Specifically, another preferred embodiment of the present invention is structured such that the rotary electrical machine control unit 22 increases the rotation speed NI of the input shaft I according to the target rotation acceleration A0 while keeping the input torque at a constant value, without performing such feedback control. In this case, it can be structured such that, when the actual rotation speed NI of the input shaft I soon corresponds to the estimated rotation speed Na after shifting, the engagement side hydraulic control unit 28 increases the engagement side hydraulic instruction value Ce instantly to a complete engagement pressure so as to turn the engagement side element Ee to a completely engaged state.

(3) In the example explained in the above-described embodiment, when the engagement side hydraulic control unit 28 increases the supplied oil pressure to the engagement side element Ee by a constant change rate in a state that the release side hydraulic control unit 29 feedback controls the supplied oil pressure to the release side element Er so that the differential rotation speed $\Delta N$ becomes substantially constant in the torque phase Pt, the phase determining unit 31 detects three phenomena: (A) detection of change of the release side hydraulic instruction value Cr to be equal to or smaller than the predetermined release determining value Cr1, (B) detection of decrease of the differential rotation speed $\Delta N$ to zero after it is determined that the torque phase Pt has started, and (C) detection of change of the engagement side hydraulic instruction value Ce to be equal to or larger than the predetermined end determining value Ce1 set in advance, and determines that the torque phase Pt has ended when a condition that one of these phenomena is detected is met. However, embodiments of the present invention are not limited to this. Specifically, another preferred embodiment of the present invention is structured such that, for example, when the phase determining unit 31 detects all of the above phenomena (A) to (C), the phase determining unit 31 determines that the torque phase Pt has ended when a condition that all or any two of these phenomena are detected is met. Another preferred embodiment of the present invention is structured such that, the phase determining unit 31 detects any two of the above phenomena (A) to (C), and determines that the torque phase Pt has ended when a condition that at least one of the two phenomena is detected is met. Moreover, another preferred embodiment of the present invention is structured such that the phase determining unit 31 detects only one of the above phenomena (A) to (C), and determines that the torque phase Pt has ended when a condition that the phenomenon is detected is met.

(4) In the present invention, it is not always necessary for the engagement side hydraulic control unit 28 to increase the supplied oil pressure to the engagement side element Ee by a constant change rate in a state that the release side hydraulic control unit 29 feedback controls the supplied oil pressure to the release side element Er so that the differential rotation speed $\Delta N$ becomes substantially constant in the torque phase Pt. The control by the release side hydraulic control unit 29 and the engagement side hydraulic control unit 28 is performed for enabling the phase determining unit 31 to detect the time point of end of the torque phase Pt as accurately as possible. Besides the above-described structure, for example, another preferred embodiment of the present invention is structured such that the phase determining unit 31 determines a time point when the differential rotation speed $\Delta N$ starts to increase from a state of zero as the time point of end of the torque phase Pt, without assuming that the above-described control by the release side hydraulic control unit 29 and the engagement side hydraulic control unit 28 is performed.

(5) In the example explained in the above-described embodiment, the vehicle control unit 2 includes the input shaft rotation speed deriving unit 33 deriving the actual rotation speed NI of the input shaft I, the estimated rotation speed deriving unit 34 deriving the estimated rotation speed of the input shaft I, and the differential rotation speed deriving unit 32 deriving the differential rotation speed $\Delta N$ between the actual rotation speed NI of the input shaft I and the estimated rotation speed Nb before shifting. The engagement side hydraulic control unit 28, the release side hydraulic control unit 29, and the phase determining unit 31 are structured to perform various controls and various determinations based on the actual rotation speed NI of the input shaft I, the estimated rotation speed of the input shaft I, and the differential rotation speed $\Delta N$. However, embodiments of the present invention are not limited to this. Specifically, for example, the vehicle control unit is structured including, instead of the estimated rotation speed deriving unit 34, an input/output rotation speed ratio deriving unit as an input/output rotation speed ratio deriving mechanism for deriving an input/output rotation speed ratio (=gear ratio) which is a ratio of the actual rotation speed NI of the input shaft I to the actual rotation speed of the output shaft O, and including, instead of the differential rotation speed deriving unit 32, a differential rotation speed ratio deriving unit as a differential rotation speed ratio deriving mechanism for deriving a differential rotation speed ratio between an actual input/output rotation speed ratio and a speed ratio before the target shift speed is changed. When the engagement side hydraulic control unit 28, the release side hydraulic control unit 29, and the phase determining unit 31 are structured to perform various controls and various determinations based on the actual rotation speed NI of the input shaft I, the actual input/output rotation speed ratio, and the differential rotation speed ratio, this is substantially the same structure. Therefore, even if such a change is made, the structure with such a change is equivalent to the structure of the present invention and is included in the technical scope of the present invention.

(6) In the example explained in the above-described embodiment, the torque phase start determining processing, the torque phase end determining processing, and the shift operation control processing according to this embodiment are performed when the regeneration downshift or the power-on upshift is performed. However, embodiments of the present invention are not limited to this. Specifically, of course the present invention can be applied also when, for example, a regeneration upshift, a power-on downshift, or the like is performed as long as it is the case where switching of shift speeds is performed at least via the torque phase Pt in the transmission 13 by controlling engagement and release of the plurality of engagement elements C1, B1, and so on.

(7) In the example explained in the above-described embodiment, as an example of the vehicle drive apparatus 1 controlled by the vehicle control unit 2, there is described a structure in which the rotor of the rotary electrical machine 12 integrally rotating with the input shaft I is drive-coupled directly to the transmission 13. However, the specific structure of the vehicle drive apparatus 1 can be set arbitrarily, as long as it is one including at least the stepped transmission 13 having a plurality of shift speeds with different speed ratios. For example, another preferred embodiment of the present invention is structured such that the vehicle drive apparatus 1 controlled by the vehicle control unit 2 includes a fluid transmission device such as a torque converter, a clutch, or the like between the rotary electrical machine 12 and the transmission 13.

(8) In the example explained in the above-described embodiment, the vehicle drive apparatus 1 controlled by the vehicle control unit 2 is a drive apparatus for a hybrid vehicle including both the engine 11 and the rotary electrical machine 12 as driving force sources. However, embodiments of the present invention are not limited to this. Specifically, the vehicle control device according to the present invention is particularly suitable for controlling a drive apparatus for a vehicle having at least the rotary electrical machine 12 as a driving force source. In another preferred embodiment of the present invention, the vehicle drive apparatus 1 controlled by the vehicle control unit 2 is a drive apparatus for an electric vehicle including only the rotary electrical machine 12 as a driving force source.

The present invention is preferably applicable to a vehicle control device for controlling a vehicle drive apparatus, which includes an input member drive-coupled to a rotary electrical machine as a driving force source, an output member drive-coupled to wheels, and a transmission shifting a rotation speed of the input member with speed ratios of shift speeds and transmitting the shifted speed to the output member.

What is claimed is:

1. A vehicle control device for controlling a vehicle drive apparatus, which includes an input member drive-coupled to a rotary electrical machine as a driving force source, an output member drive-coupled to a wheel, and a transmission having a plurality of engagement elements and a plurality of shift speeds in a switchable manner, shifting a rotation speed of the input member with speed ratios of the shift speeds and transmitting the shifted speed to the output member, wherein the vehicle control device controls switching of shift speeds, which is performed at least via a torque phase in the transmission, by controlling engagement and release of the plurality of engagement elements, the vehicle control device comprising:
    a phase determining mechanism for determining end of the torque phase in a shift operation;
    a rotary electrical machine control mechanism for controlling torque of the rotary electrical machine using a variation of input torque, which is derived so that a rotation speed change rate of the input member becomes a target rotation speed change rate, so as to increase or decrease input torque inputted to the input member by the variation of the input torque according to a direction of switching of shift speeds after the phase determining mechanism determines that the torque phase has ended; and
    an engagement control mechanism for feedback controlling supplied oil pressure to an engagement side element as an engagement element on a side to be engaged after switching of shift speeds so that the rotation speed change rate of the input member becomes the target rotation speed change rate.

2. The vehicle control device according to claim 1, wherein the rotary electrical machine control mechanism keeps the input torque at a constant value in a state that the input torque is increased or decreased.

3. The vehicle control device according to claim 2, wherein the target rotation speed change rate is determined based on speed ratios before and after switching of shift speeds so that an inertia phase in the shift operation can end in a target time.

4. The vehicle control device according to claim 3, wherein after an actual rotation speed of the input member becomes close to an estimated rotation speed after shifting of the input member, which is derived based on a rotation speed of the output member and a speed ratio of the transmission after shifting,
    in a state that the engagement control mechanism keeps the supplied oil pressure to the engagement side element at a constant value,
    the rotary electrical machine control mechanism feedback controls the torque of the rotary electrical machine so as to synchronize the actual rotation speed of the input member with the estimated rotation speed after shifting.

5. The vehicle control device according to claim 4, further comprising:
    a release control mechanism for feedback controlling supplied oil pressure to a release side element as an engagement element on a side to be released so that a differential rotation speed becomes substantially constant, which is a difference in rotation speed between the actual rotation speed of the input member and an estimated rotation speed before shifting of the input member derived based on the rotation speed of the output member before shifting and a speed ratio of the transmission; and
an engagement control mechanism for increasing the supplied oil pressure to the engagement side element in a state that the differential rotation speed is substantially constant, wherein
the phase determining mechanism determines that the torque phase has ended when at least one of the following conditions is met: change of a release side hydraulic instruction value, which is an instruction value of the supplied oil pressure to the release side element, to be equal to a predetermined release determining value corresponding to oil pressure at which a transfer torque capacity in the release side element becomes zero is detected; and decrease of the differential rotation speed to zero is detected.

6. The vehicle control device according to claim 1, wherein after an actual rotation speed of the input member becomes close to an estimated rotation speed after shifting of the input member, which is derived based on a rotation speed of the output member and a speed ratio of the transmission after shifting,
in a state that the engagement control mechanism keeps the supplied oil pressure to the engagement side element at a constant value,
the rotary electrical machine control mechanism feedback controls the torque of the rotary electrical machine so as to synchronize the actual rotation speed of the input member with the estimated rotation speed after shifting.

7. The vehicle control device according to claim 1, further comprising:
a release control mechanism for feedback controlling supplied oil pressure to a release side element as an engagement element on a side to be released so that a differential rotation speed becomes substantially constant, which is a difference in rotation speed between the actual rotation speed of the input member and an estimated rotation speed before shifting of the input member derived based on the rotation speed of the output member before shifting and a speed ratio of the transmission; and
an engagement control mechanism for increasing the supplied oil pressure to the engagement side element in a state that the differential rotation speed is substantially constant, wherein
the phase determining mechanism determines that the torque phase has ended when at least one of the following conditions is met: change of a release side hydraulic instruction value, which is an instruction value of the supplied oil pressure to the release side element, to be equal to a predetermined release determining value corresponding to oil pressure at which a transfer torque capacity in the release side element becomes zero is detected; and decrease of the differential rotation speed to zero is detected.

* * * * *